United States Patent
Harima et al.

(10) Patent No.: US 9,634,298 B2
(45) Date of Patent: Apr. 25, 2017

(54) HERMETICALLY SEALED BATTERY AND METHOD FOR MANUFACTURING THE SAME

(75) Inventors: Yukio Harima, Osaka (JP); Koji Funami, Kyoto (JP); Seiji Kumazawa, Osaka (JP); Kyosuke Miyata, Osaka (JP); Takahiro Fukuoka, Osaka (JP); Seiichi Kato, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 652 days.

(21) Appl. No.: 13/381,858

(22) PCT Filed: Jul. 21, 2010

(86) PCT No.: PCT/JP2010/004671
§ 371 (c)(1),
(2), (4) Date: Dec. 30, 2011

(87) PCT Pub. No.: WO2011/016194
PCT Pub. Date: Feb. 10, 2011

(65) Prior Publication Data
US 2012/0121954 A1    May 17, 2012

(30) Foreign Application Priority Data
Aug. 5, 2009  (JP) .................. 2009-182154

(51) Int. Cl.
*H01M 2/26* (2006.01)
*H01M 2/04* (2006.01)
*H01M 2/22* (2006.01)

(52) U.S. Cl.
CPC ......... *H01M 2/0413* (2013.01); *H01M 2/046* (2013.01); *H01M 2/0486* (2013.01);
(Continued)

(58) Field of Classification Search
CPC .................. H01M 2/263; H01M 2/22–2/30
(Continued)

(56) References Cited

U.S. PATENT DOCUMENTS

| 6,692,863 | B1 |   | 2/2004 | Nakanishi et al. |
| 6,703,158 | B1 | * | 3/2004 | Hirano ............... 429/94 |

(Continued)

FOREIGN PATENT DOCUMENTS

| JP | 2000-299099 | 10/2000 |
| JP | 2003-109576 | 4/2003 |

(Continued)

OTHER PUBLICATIONS

Machine Translation of JP 2007-234276 to Yamahira et al. published Sep. 13, 2007.*

(Continued)

*Primary Examiner* — Jonathan G Leong
(74) *Attorney, Agent, or Firm* — McDermott Will & Emery LLP

(57) ABSTRACT

A sealed battery including: an electrode group 4 formed by winding or stacking a positive electrode plate 1 and a negative electrode plate 2 with a separator 3 interposed between the positive electrode plate 1 and the negative electrode plate 2, and housed in a battery case 5, an opening of the battery case 5 being sealed with a sealing plate, wherein a lead 11 extending from one of the electrode plates in the electrode group 4 is laser-welded to the sealing plate 10, and a melting width of an end section 13 of a welded portion 9 between the lead 11 and the sealing plate 10 is smaller than a melting width of a center section of the welded portion 9.

3 Claims, 8 Drawing Sheets

(a)

(b)

(52) U.S. Cl.
CPC ............. *H01M 2/22* (2013.01); *H01M 2/263* (2013.01); *Y10T 29/4911* (2015.01)

(58) Field of Classification Search
USPC ........................ 429/122–347; 29/623.1–623.5
See application file for complete search history.

(56) References Cited

U.S. PATENT DOCUMENTS

| | | | |
|---|---|---|---|
| 2003/0077508 A1* | 4/2003 | Asahina et al. | 429/160 |
| 2006/0096958 A1* | 5/2006 | Zhao | B23K 11/10 219/121.64 |
| 2010/0247992 A1 | 9/2010 | Miyata et al. | |

FOREIGN PATENT DOCUMENTS

| | | |
|---|---|---|
| JP | 2005-038866 | 2/2005 |
| JP | 2005-347415 | 12/2005 |
| JP | 2007-234276 | 9/2007 |

OTHER PUBLICATIONS

International Search Report issued in International Patent Application No. PCT/JP2010/004671 dated Oct. 5, 2010.

* cited by examiner

HERMETICALLY SEALED BATTERY AND METHOD FOR MANUFACTURING THE SAME

RELATED APPLICATIONS

This application is the U.S. National Phase under 35 U.S.C. §371 of International Application No. PCT/JP2010/004671, filed on Jul. 21, 2010, which in turn claims the benefit of Japanese Application No. 2009-182154, filed on Aug. 5, 2009, the disclosures of which Applications are incorporated by reference herein.

TECHNICAL FIELD

The present invention relates to sealed batteries and methods for fabricating the same, specifically to a joint structure between a sealing plate and a lead extending from an electrode group.

BACKGROUND ART

In recent years, sealed batteries have widely been used. Examples of such sealed batteries include aqueous electrolyte batteries typified by high-capacity alkaline storage batteries and nonaqueous electrolyte batteries typified by lithium-ion batteries which are increasingly used as power sources for driving portable electronic devices or other devices. Moreover, with increase of functions of the electronic devices and communication devices in recent years, sealed batteries with higher capacity have been in demand. As the capacity of the sealed batteries increases, measures for safety are to be emphasized. In particular, internal short-circuits, or the like in sealed batteries may cause a rapid temperature rise, which may lead to thermal runaway. Thus, it is strongly demanded to improve the safety. In particular, large-size, high-power sealed batteries require the technique of, for example, reducing the thermal runaway in order to improve the safety.

These sealed batteries have a sealed structure in which an electrode group formed by winding or stacking a positive electrode plate and a negative electrode plate with a separator interposed between the positive electrode plate and the negative electrode plate is housed in a battery case together with an electrolyte, and in which an opening of the battery case is sealed with a sealing plate with a gasket sandwiched between the opening and the sealing plate. In this structure, a lead extending from one of the electrode plates (e.g., the positive electrode plate) in the electrode group is connected to the sealing plate serving as an external terminal at one side, whereas a lead extending from the other electrode plate (e.g., the negative electrode plate) in the electrode group is connected to an inner surface of the battery case serving as an external terminal at the other side. To connect the lead to the sealing plate or to the inner surface of the battery case, resistance welding is widely employed.

The opening of the battery case is sealed by resistance-welding the lead extending from the electrode group to the sealing plate, with the electrode group being housed in the battery case, and then bending the lead to be housed in the battery case to seal the opening of the battery case with the sealing plate. In this process, while the lead extending from the electrode group is resistance-welded to the sealing plate, substances (mainly metal particles removed from a welded portion of the lead) can be sputtered. If these sputtered substances enter the electrode group in the battery case, the separator might be damaged, resulting in an internal short-circuit. In another case where sputtered substances adhere to the gasket joined to the periphery of the sealing plate, when the opening of the battery case is sealed with the sealing plate by crimping with a gasket sandwiched between the opening and the sealing plate, a portion of the gasket narrowed by crimping might be sheared by the sputtered substances. Consequently, the battery case and the sealing plate come into contact with each other while sandwiching the sputtered substances therebetween, resulting in a short circuit.

To prevent such a short circuit caused by, for example, contamination by sputtered substances, the opening of a battery case may be covered with a thin plate or the like during production so as to prevent sputtered substances from entering the battery case, for example, during resistance welding of the lead extending from the electrode group to the sealing plate. However, the opening cannot be completely covered, and thus, such covering is insufficient for preventing contamination by sputtered substances.

On the other hand, joining by ultrasonic welding, instead of resistance welding, does not cause melting as caused by the resistance welding, and thus contamination by sputtered substances can be prevented in principle. However, joining by ultrasonic welding exhibits a lower joint strength than that obtained by the resistance welding. In addition, if the sealing plate has a safety mechanism for explosion protection, ultrasonic vibration might affect the function of the safety mechanism, or might cause peeling off of an active material from the electrode plate. Thus, joining by the ultrasonic welding is not preferable in reliability.

Since aluminum is generally used as a material for current collectors of positive electrode plates of lithium ion secondary batteries, the leads extending from the positive electrode plates also use aluminum. In addition, to reduce the weight of batteries, the battery cases and the sealing plates have begun to use aluminum. In this case, welding between the lead and the sealing plate means connection between aluminum components. In general, aluminum has a higher electric conductivity and a higher thermal conductivity than those of steel. Accordingly, a large current needs to flow for a short period in resistance welding of aluminum components, resulting in that a welding rod used in the resistance welding wears worse in aluminum welding than in steel welding, and it is difficult to maintain stable welding for a long period.

To prevent this problem, laser welding using a pulse oscillation YAG laser which is capable of locally concentrating energy is employed for welding between the lead and the sealing plate. Since a laser beam can be narrowed in the laser welding, the melted area can be smaller in the laser welding than in the resistance welding. Accordingly, the amount of sputtered substances can be reduced.

Figure 7:
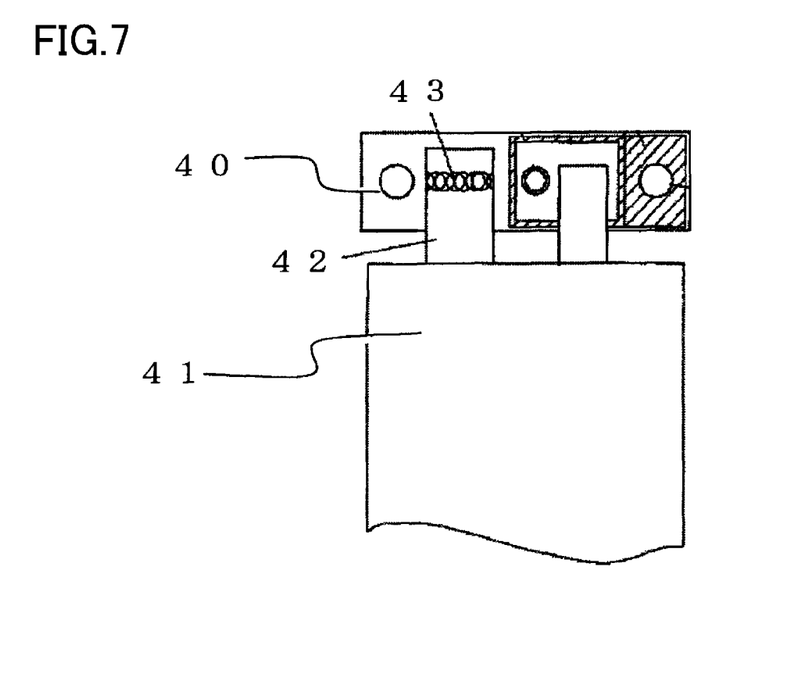
FIG. 7 is a view schematically illustrating part of a battery at which a lead is laser-welded to a sealing plate of a conventional example.
Figure 8:
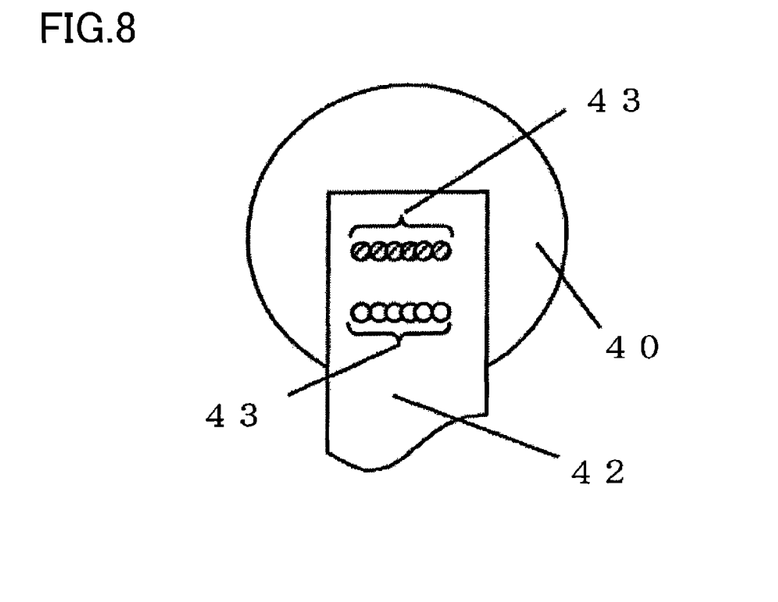
FIG. 8 is an enlarged view illustrating a vicinity of a welded portion between the lead and the sealing plate of the conventional example.

For example, Patent Documents 1, 2 disclose, as illustrated in FIGS. 7, 8, a method in which a lead 42 extending from an electrode group 41 is laser-welded to a sealing plate 40 by a pulse oscillation YAG laser to join the lead 42 to the sealing plate 40 at two or more welded portions 43.

CITATION LIST

Patent Document

PATENT DOCUMENT 1: Japanese Patent Publication No. 2000-299099

PATENT DOCUMENT 2: Japanese Patent Publication No. 2007-234276

SUMMARY OF THE INVENTION

Technical Problem

As described above, welding a lead to a sealing plate is necessarily influenced by sputtering during processes, but when laser is used for welding, the influence of the sputtering can be significantly reduced.

However, a reliability test performed by the inventors of the present application on lithium ion secondary batteries each of which was fabricated by joining a lead to a sealing plate by welding using a pulse oscillation YAG laser showed a certain proportion of lithium ion secondary batteries in which heat was generated probably because of short circuiting.

A further examination of the lithium ion secondary batteries in which heat was generated showed that an internal short circuit was caused by a short circuit occurring between the opening of the battery case and the sealing plate due to shearing of the gasket and damage on the separator. This phenomenon was analyzed, and it was found that foreign substances which have caused the short circuit contained aluminum as materials for the lead and the sealing plate.

In view of this result, sputtering was probably caused by variations in some external factors in fabrication processes during laser welding between the lead and the sealing plate, and the sputtered substances probably adhered to the gasket or entered the battery case.

The amount of the sputtered substances was large, particularly when a hole was formed in the lead. The hole was formed probably because a gap existed between the lead and the sealing plate, and impurities such as oil and fat were sandwiched between the lead and the sealing plate. In order to eliminate sputtered substances produced due to such causes, the gap between the lead and the sealing plate has to be completely eliminated, or oil and fat components on surfaces of the lead and the sealing plate have to be completely removed, which is a difficult task in actual mass production processes.

In order to avoid internal short circuits, the present inventors have conducted various studies on welding between a sealing plate and a lead extending from an electrode group, and have found the following problems.

The process of laser-welding a sealing plate to a lead extending from an electrode group will be described in detail. In a lithium ion secondary battery, a lead has a thickness of about 0.1 mm-0.2 mm, a sealing plate has a thickness of about 0.3 mm-0.5 mm at its portion to which the lead is joined, and a YAG laser beam has a spot diameter of about 0.6 mm-0.8 mm. Here, since the thickness of the lead is smaller than the spot diameter of the laser beam, welding of a heat conduction type was performed in YAG laser welding so that no hole was formed in the lead. Thus, the melted area in laser welding was large, and sputtered substances were produced due to a gap between the lead and the sealing plate and due to external factors such as adhered oil.

FIGS. 9A-9D are cross-sectional views schematically illustrating the process of laser-welding the lead 42 to the sealing plate 40 by a YAG laser with a gap 50 provided between the lead 42 and the sealing plate 40.

Figure 9:
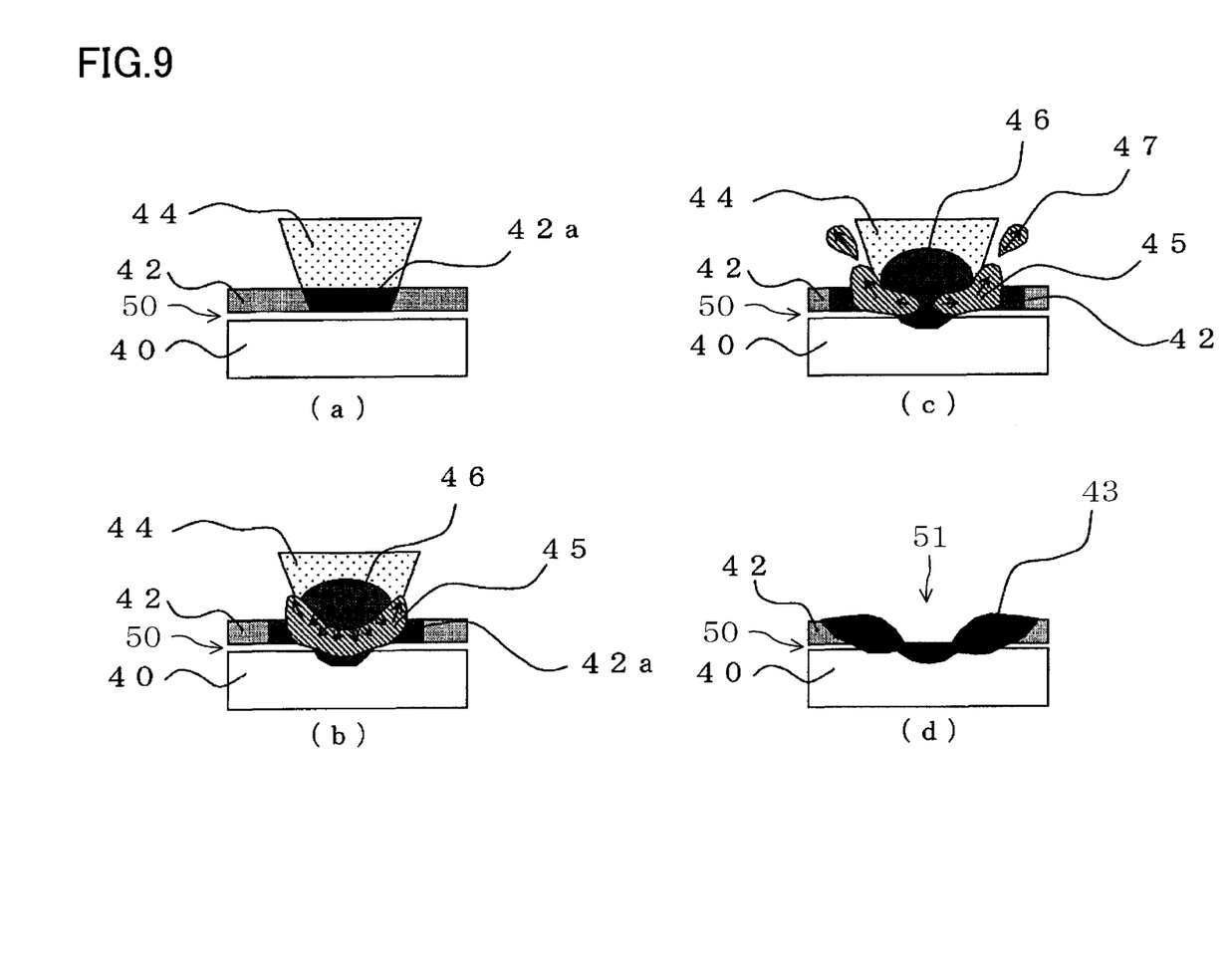
FIGS. 9A-9D are cross-sectional views schematically illustrating the process of laser-welding a lead to a sealing plate with a gap provided between the lead and the sealing plate.

As illustrated in FIG. 9A, when a laser beam 44 is applied to the lead 42, a heated region 42a is formed in part of the lead 42 to which the laser beam 44 is applied. Since the gap 50 is provided between the lead 42 and the sealing plate 40, heat is not directly conducted to the sealing plate 40. Thus, the temperature of the heated region 42a rapidly increases, and as illustrated in 9B, a welded portion 45 of the heated region 42a expands, and high-pressure plasma 46 made of vapor of melted metal from the welded portion 45 is generated.

Therefore, as illustrated in FIG. 9C, part of the melted metal is sputtered by the pressure of the high-pressure plasma 46, so that sputtered substances 47 are produced. In this case, as illustrated in FIG. 9D, a large hole 51 is formed in a welded portion 43 of the lead 42. The sputtered substances 47 adhere to a gasket attached to a peripheral portion of the sealing plate 40 or enter a battery case of a sealed battery. This may cause short-circuiting between the battery case and the sealing plate 40, or may form an internal short-circuit due to damage on a separator. Moreover, when the hole 51 is formed in the welded portion 43, connection strength also lowers.

Next, FIGS. 10A-10D are cross-sectional views schematically illustrating the process of laser-welding the lead 42 to the sealing plate 40 with a foreign substance 49 being adhered to an interface between the lead 42 and the sealing plate 40. Since lubricant such as grease is used in sliding sections of facilities used for assembling the sealing plate 40, examples of the foreign substance 49 may include the grease adhered to a surface of the sealing plate 40 in assembling the sealing plate 40.

Figure 10:
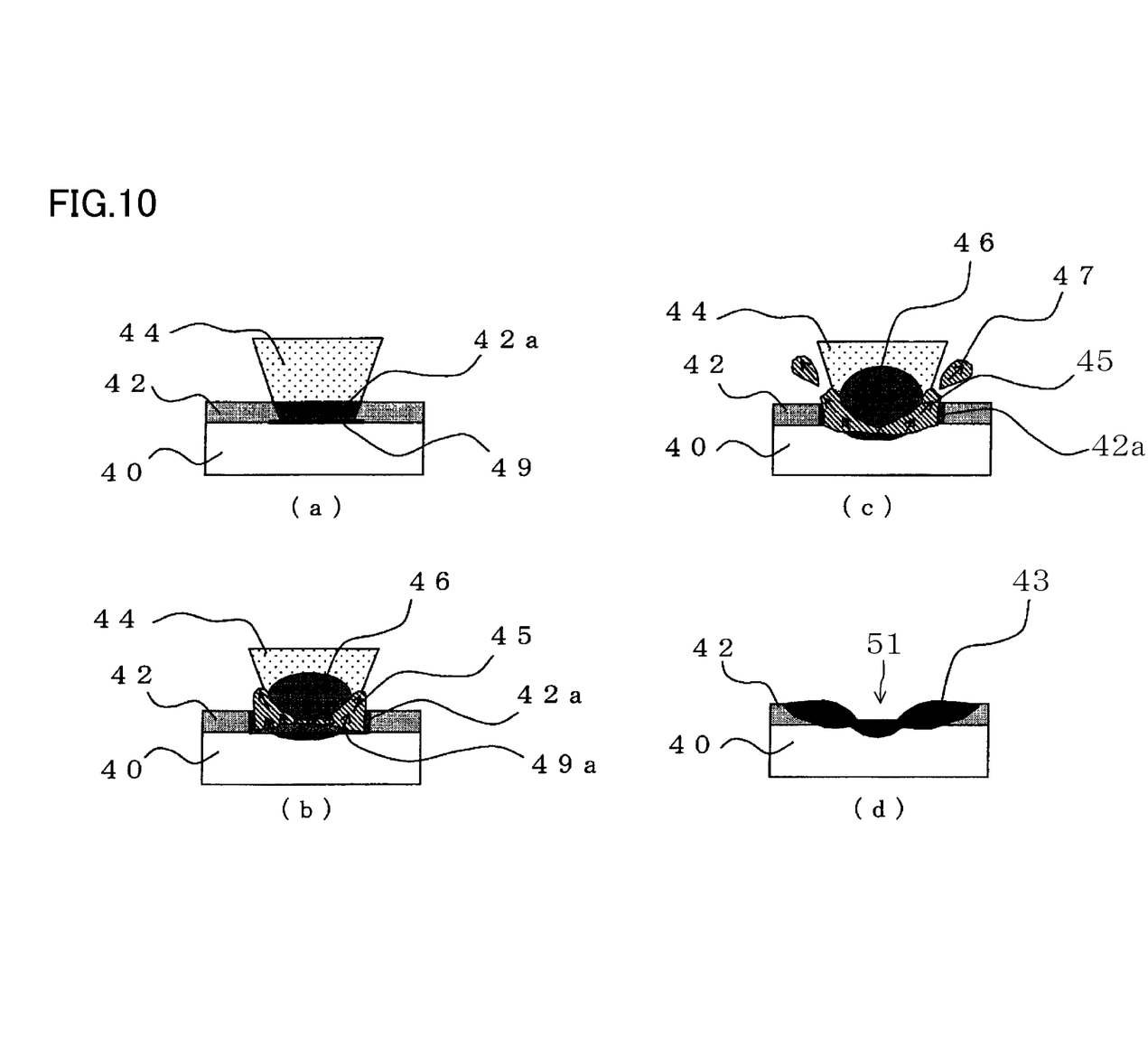
FIGS. 10A-10D are cross-sectional views schematically illustrating the process of laser-welding a lead to a sealing plate with a foreign substance being attached to an interface between the lead and the sealing plate.

As illustrated in FIG. 10A, when the laser beam 44 is applied to the lead 42 with the lead 42 being in contact with the sealing plate 40, a heated region 42a is formed in part of the lead 42 to which the laser beam 44 is applied. As illustrated in FIG. 10B, part of the heated region 42a is melted, thereby forming a welded portion 45, and generating high-pressure plasma 46 made of vapor of melted metal from the welded portion 45. Here, applying the laser beam 44 vaporizes heated and melted foreign substance 49a. As a result, as illustrated in FIG. 10C, the welded portion 45 expands, and part of the melted metal is sputtered by pressing force caused by volume expansion of the vaporized foreign substance, thereby producing sputtered substances 47. Then, when the application of the laser beam 44 is stopped, as illustrated in FIG. 10D, the welded portion 45 is cooled, and hardens, so that joining the lead 42 to the sealing plate 40 is completed. The sputtered substances 47 are produced, so that a hole 51 is formed in a welded portion 43 of the lead 42.

As described above, when the foreign substance 49 adhere to the interface between the lead 42 and the sealing plate 40, rapid volume expansion by vaporizing the foreign substance 49 causes pressing force, which increases the amount of the sputtered substances 47. The sputtered substances 47 adhere to a gasket attached to a peripheral portion of the sealing plate 40, or enter the battery case of the sealed battery. This causes short-circuiting between the battery case and the sealing plate 40, or an internal short-circuit due to damage on the separator. Moreover, when the hole 51 is formed in the welded portion 43, the connection strength lowers.

In view of the foregoing, the present invention was devised. It is a major objective of the present invention to provide a highly reliable sealed battery, where even when external factors (formation of a gap between a lead and a sealing plate, or a foreign substance entered between the lead and the sealing plate) in fabrication processes vary in the process of welding the lead to a sealing plate, formation of a hole in the lead is reduced, the amount of sputtered substance produced in welding by a laser beam is significantly reduced, the joint strength between the lead and the sealing plate is high, and abnormal heat generation due to an internal short-circuit does not occur.

Solution to the Problem

To achieve the above objective, an sealed battery of the present invention includes: an electrode group formed by winding or stacking a positive electrode plate and a negative electrode plate with a separator interposed between the positive electrode plate and the negative electrode plate, and housed in a battery case, an opening of the battery case being sealed with a sealing plate, wherein a lead extending from one of the electrode plates in the electrode group is laser-welded to the sealing plate, and a melting width of an end section of a welded portion between the lead and the sealing plate is smaller than a melting width of a center section of the welded portion.

Moreover, a method for fabricating a sealed battery of the present invention includes: forming an electrode group by winding or stacking a positive electrode plate and a negative electrode plate with a separator interposed between the positive electrode plate and the negative electrode plate; connecting one end of a lead to any one of the electrode plates in the electrode group; housing the electrode group in a battery case; laser-welding the other end of the lead to a sealing plate by continuously scanning a laser beam having a spot diameter smaller than a thickness of the lead to apply the laser beam to the lead, with the other end brought into contact with the sealing plate; and sealing an opening of the battery case with the sealing plate, wherein a melting width of an end section of a welded portion formed between the lead and the sealing plate by the laser welding is smaller than a melting width of a center section of the welded portion.

Advantages of the Invention

According to the present invention, even when external factors in fabrication processes in welding a lead to a sealing plate vary, it is possible to reduce formation of a hole in the lead, and to significantly reduce the amount of sputtered substances produced in welding by using a laser beam while the joint strength between the lead and the sealing plate is maintained. Thus, it is possible to provide a highly reliable sealed battery having a high joint strength, wherein abnormal heat generation due to an internal short-circuit does not occur in the sealed battery.

DESCRIPTION OF EMBODIMENTS

A sealed battery of the present invention includes: an electrode group formed by winding or stacking a positive electrode plate and a negative electrode plate with a separator interposed between the positive electrode plate and the negative electrode plate, and housed in a battery case, an opening of the battery case being sealed with a sealing plate, wherein a lead extending from one of the electrode plates in the electrode group is laser-welded to the sealing plate, and a melting width of an end section of a welded portion between the lead and the sealing plate is smaller than a melting width of a center section of the welded portion. With this configuration, even when external factors in fabrication processes in welding a lead to a sealing plate vary, it is possible to reduce formation of a hole in the lead, and to significantly reduce the amount of sputtered substances produced in welding by using a laser beam while the joint strength between the lead and the sealing plate is maintained. Thus, it is possible to provide a highly reliable sealed battery having a high joint strength, wherein abnormal heat generation due to an internal short-circuit does not occur in the sealed battery.

Here, a melting width of an end section at a melting end side of the welded portion between the lead and the sealing plate is preferably smaller than the melting width of the center section of the welded portion. With this configuration, formation of a recess in the melting cross section can be reduced at the end section at the melting end side of the welded portion.

Moreover, the lead is preferably laser-welded to the sealing plate by continuously scanning a laser beam having a spot diameter smaller than a thickness of the lead. With this configuration, the welded portion between the lead and the sealing plate is formed by deep penetration welding, and the melted area is small. Thus, even when external factors in fabrication processes in welding the lead to the sealing plate vary, it is possible to significantly reduce sputtered substances.

Furthermore, the melting width of the end section of the welded portion is preferably smaller than or equal to ⅕ of the melting width of the center section of the welded portion. With this configuration, formation of a recess or a hole in the melting cross section can be reduced at the end section at the melting end side or the melting start side of the welded portion.

A method for fabricating a sealed battery of the present invention includes: forming an electrode group by winding or stacking a positive electrode plate and a negative electrode plate with a separator interposed between the positive electrode plate and the negative electrode plate; connecting one end of a lead to any one of the electrode plates in the electrode group; housing the electrode group in a battery case; laser-welding the other end of the lead to a sealing plate by continuously scanning a laser beam having a spot diameter smaller than a thickness of the lead to apply the laser beam to the lead, with the other end brought into contact with the sealing plate; and sealing an opening of the battery case with the sealing plate, wherein a melting width of an end section of a welded portion formed between the lead and the sealing plate by the laser welding is smaller than a melting width of a center section of the welded portion. With this method, even when external factors in fabrication processes in welding the lead to the sealing plate vary, formation of a hole in the lead can be reduced, and the amount of sputtered substances produced in welding by using a laser beam can be significantly reduced, while the joint strength between the lead and the sealing plate is maintained. Thus, it is possible to provide a highly reliable sealed battery having a high joint strength, wherein abnormal heat generation due to an internal short-circuit does not occur in the sealed battery.

Here, a melting width of an end section at a melting end side of a welded portion formed between the lead and the sealing plate by the laser welding is preferably smaller than the melting width of the center section of the welded portion. With this configuration, formation of a recess in the melting cross section can be reduced at the end section at the melting end side of the welded portion.

Moreover, a spot diameter of the laser beam is preferably 1/10-1/2 of a thickness of the lead. With this configuration, the welded portion between the lead and the sealing plate is formed by deep penetration keyhole welding, and the melted area is small. Thus, even when external factors in fabrication processes in welding the lead to the sealing plate vary, it is possible to significantly reduce sputtered substances.

Moreover, in applying the laser beam, negative pressure may be created in the periphery of the welded portion between the lead and the sealing plate, or suction may be performed in the periphery of the welded portion between the lead and the sealing plate (for example, suction may be performed while magnetic force is generated in the periphery of the laser welded portion). With this method, sputtered substances floating in metal vapor when the lead is melted can be removed in a forced manner, and internal short-circuits caused by the sputtered substances can be significantly reduced.

Embodiments of the present invention will be described in detail below with reference to the drawings. The present invention is not limited to the following embodiments. The embodiment can be modified without deviating from the effective scope of the present invention. The embodiment can be combined with other embodiments.

Figure 1:
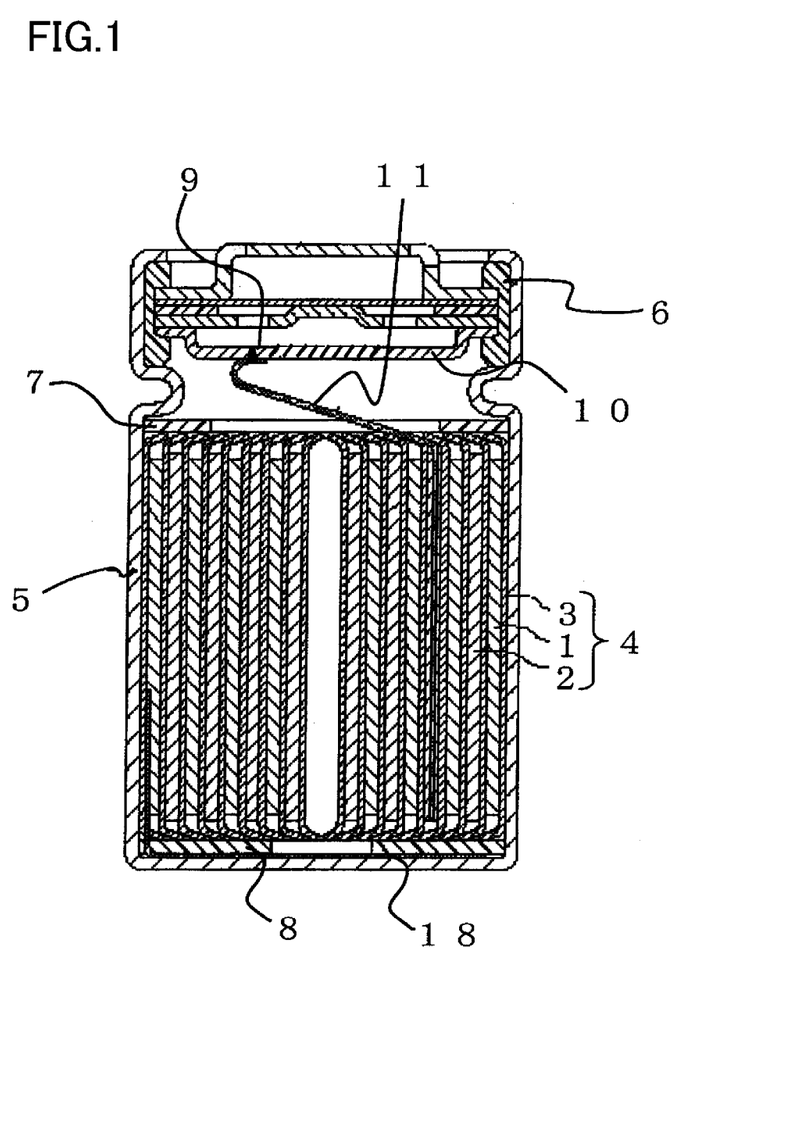
FIG. 1 is a cross-sectional view schematically illustrating a configuration of a sealed battery of an embodiment of the present invention.

FIG. 1 is a cross-sectional view schematically illustrating a configuration of a sealed battery of an embodiment of the present invention. As illustrated in FIG. 1, an electrode group 4 formed by winding a positive electrode plate 1 and a negative electrode plate 2 with a separator 3 interposed between the positive electrode plate 1 and the negative electrode plate 2 is housed in a battery case 5 together with an electrolyte, with the electrode group being sandwiched between insulating plates 7, 8. An opening of the battery case 5 is sealed with a sealing plate 10 via a gasket 6. A lead 11 extending from one of the electrode plates in the electrode group 4 (e.g., the positive electrode plate 1) is laser-welded to the sealing plate 10, and the other electrode plate (e.g., the negative electrode plate 2) is laser-welded to a bottom of the battery case 5.

Figure 2:
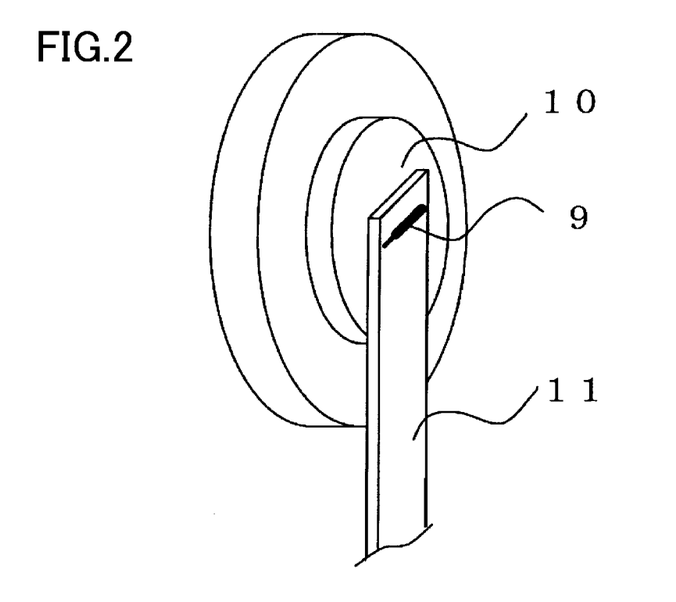
FIG. 2 is an enlarged view illustrating a vicinity of a welded portion between a lead and a sealing plate of the embodiment of the present invention.

FIG. 2 is an enlarged view illustrating the vicinity of a portion at which the lead 11 is laser-welded to the sealing plate 10. As illustrated in FIG. 2, the melting width of an end section of a welded portion 9 between the lead 11 and the sealing plate 10 is smaller than the melting width of a center section of the welded portion 9.

The sealed battery of the embodiment of the present invention is fabricated as follows. First, a positive electrode plate 1 and a negative electrode plate 2 are wound with a separator 3 interposed therebetween, thereby forming an electrode group 4. Then, one end of a lead 11 is connected to any one of the electrode plates in the electrode group 4 (e.g., the positive electrode plate 1). Thereafter, the electrode group 4 is housed in a battery case 5 with the electrode group 4 being sandwiched between insulating plates 7, 8. After that, a lead 18 extending from an end section of one of the electrode plates in the electrode group 4 (e.g., the negative electrode plate 2) is welded to a bottom of the battery case 5. Then, the other end of the lead 11 extending from an end section of the other electrode plate in the electrode group 4 (e.g., the positive electrode plate 1) is brought into contact with a sealing plate 10, and the other end of the lead 11 is laser-welded to the sealing plate 10 by continuously scanning a laser beam having a spot diameter smaller than the thickness of the lead 11 to apply the laser beam to the lead. Thereafter, an opening of the battery case 5 is sealed with the sealing plate 10 to complete the sealed battery.

Here, in laser-welding the lead 11 to the sealing plate 10 by applying the laser beam, negative pressure may be created in the periphery of a welded portion 9, or suction may be performed in the periphery of the welded portion so that sputtered substances floating in metal vapor of the melted lead 11 are removed in a forced manner. In the latter case, for example, if the sputtered substances are magnetic substances, the suction is performed while magnetic force is generated in the periphery of the welded portion 9, so that the sputtered substances floating in the metal vapor can be removed in a forced manner. In this way, internal short-circuits formed due to the sputtered substances can be significantly reduced.

Figure 3:
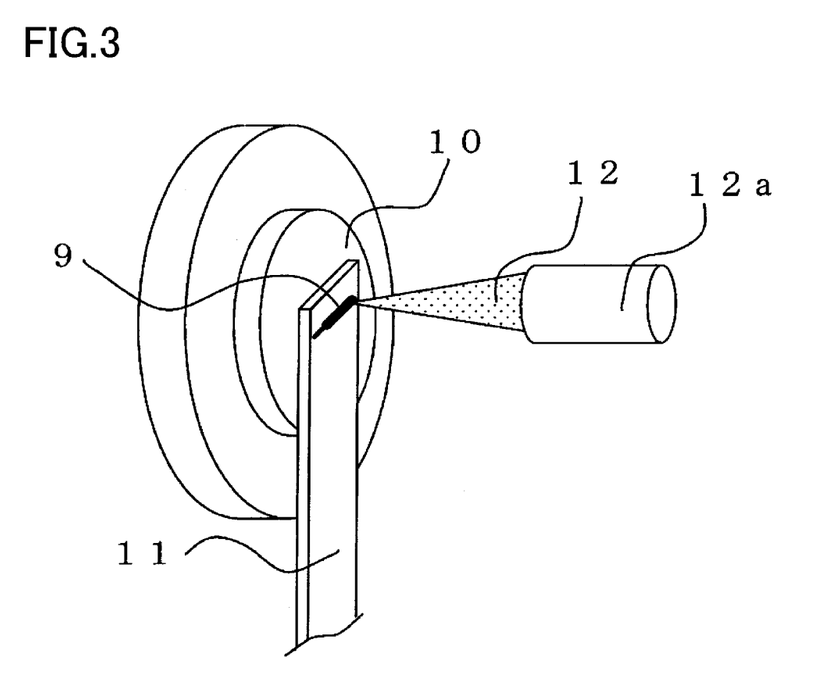
FIG. 3 is a view schematically illustrating an application state of a laser beam in laser-welding the lead to the sealing plate of the embodiment of the present invention.

FIG. 3 is a view schematically illustrating an application state of the laser beam in laser-welding the lead 11 to the sealing plate 10. As illustrated in FIG. 3, the lead 11 is laser-welded to the sealing plate 10 by scanning, along a width direction of the lead 11, a laser beam 12 output from a laser processing head 12a. In this case, the melting width of an end section at a melting start side of the welded portion 9 between the lead 11 and the sealing plate 10 is smaller than the melting width of the center section of the welded portion 9.

Figure 4:
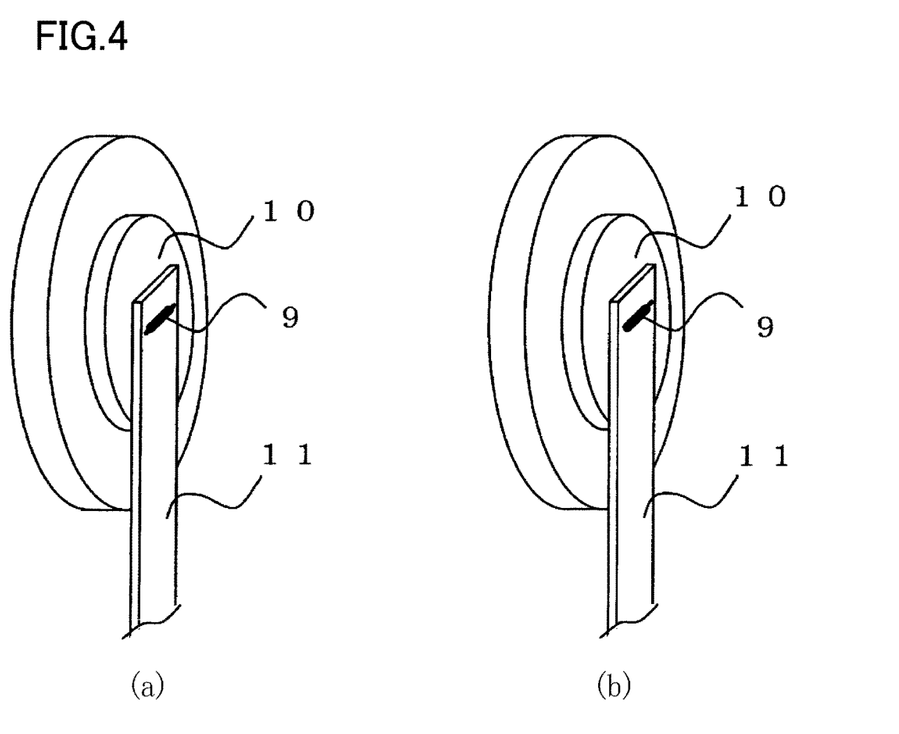
FIGS. 4A, 4B are enlarged views each illustrating a vicinity of a welded portion between a lead and a sealing plate of another embodiment of the present invention.

FIGS. 4A, 4B are enlarged views illustrating other embodiments of a welded portion between the lead 11 and the sealing plate 10. In FIG. 4A, the melting width of each of end sections of a welded portion 9 is smaller than the melting width of a center section of the welded portion 9. In FIG. 4B, the melting width of the welded portion 9 at a welding end side is smaller than the melting width of the center section of the welded portion 9.

FIGS. 5A-5E are cross-sectional views schematically illustrating the process of laser-welding the lead 11 to the sealing plate 10.

Figure 5:
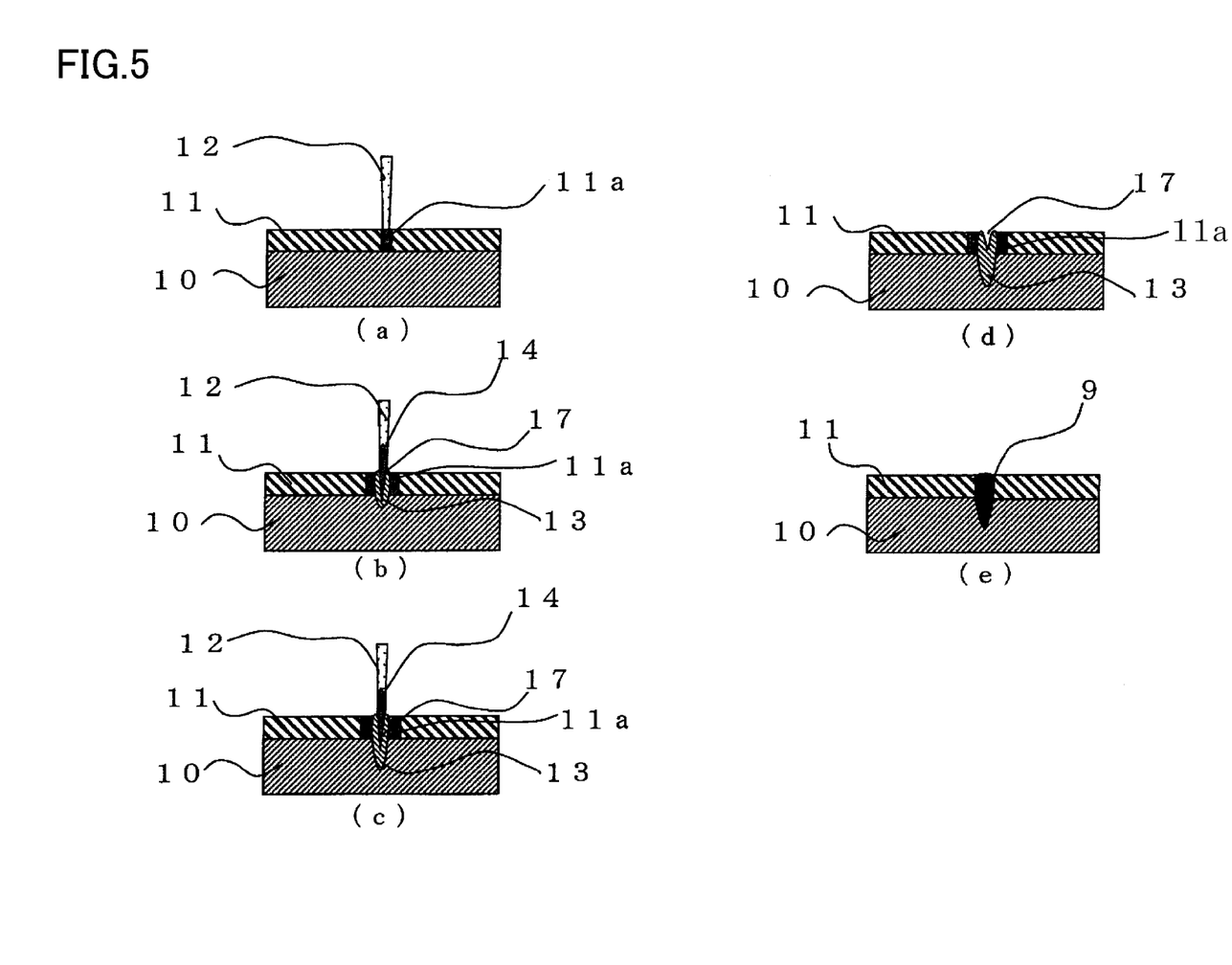
FIGS. 5A-5E are cross-sectional views illustrating the process of laser-welding the lead to the sealing plate of the embodiment of the present invention.

As illustrated in 5A, when the laser beam 12 is applied to the lead 11 with the lead 11 being in contact with the sealing plate 10, a heated region 11a is formed in part of the lead 11 to which the laser beam 12 is applied. Note that the spot diameter of the laser beam 12 here is smaller than the thickness of the lead 11, and the spot diameter of the laser beam 12 is preferably 1/10-1/2 of the thickness of the lead 11, and in order to perform stabler keyhole welding, the spot diameter of the laser beam 12 is preferably 1/10-1/5 of the thickness of the lead. If the spot diameter of the laser beam 12 is larger than 1/2 of the thickness of the lead 11, the melted area is large, the temperature of the heated region 11a rapidly increases, and melted metal is sputtered, so that it becomes difficult to reduce sputtered substances. In contrast, if the spot diameter of the laser beam 12 is smaller than 1/10 of the thickness of the lead 11, the welding strength between the sealing plate 10 and the lead 11 is reduced, and when the lead 11 is bent, and the sealing plate 10 is placed over the opening of the battery case 5 in order to seal the opening, the lead 11 may be detached from the sealing plate 10.

As the spot diameter of the laser beam 12 decreases, the laser power density of the heated region 11a increases in inverse proportion to the square of the spot diameter. For example, when a fiber laser in which optical fibers themselves serve as a laser oscillator is used, a laser beam from the fiber laser has significantly high quality, and thus the spot diameter can be sufficiently small. In the experiments performed by the present inventors, the spot diameter can be 0.1 mm, and further, when conditions of use of the fiber laser are set, the spot diameter can be reduced to 0.01 mm.

When the spot diameter is thus reduced, part of the heated region 11a is, as illustrated in FIG. 5B, rapidly melted, thereby forming the welded portion 9, and a keyhole 17 is formed by repulsive force produced when high-pressure plasma 14 made of metal vapor of the melted lead 11 evaporates.

Moreover, as illustrated in FIG. 5C, the laser beam 12 enters the keyhole 17, and multiple reflection of the laser beam 12 occurs within the keyhole 17, so that the keyhole 17 further enlarges, and the welded portion 9 extends deep into the sealing plate 10.

At the instant applying the laser beam 12 is stopped, as illustrated in FIG. 5D, the welded portion 9 has the keyhole 17. After that, as illustrated in FIG. 5E, when the welded portion 9 solidifies, the keyhole 17 is filled due to the surface tension of the melted metal, so that welding of the lead 11 to the sealing plate 10 is completed.

As described above, the welded portion 9 between the lead 11 and the sealing plate 10 is formed by deep penetration keyhole welding, and the melting width and the volume required for laser-welding are significantly reduced. Moreover, in the keyhole welding, the multiple reflection of the laser beam 12 occurs within the keyhole 17, so that the energy of the laser beam is efficiently absorbed in the lead 11 and the sealing plate 10. Therefore, in the keyhole welding, the energy of the laser beam can be reduced compared to the welding of a heat conduction type (the energy of the laser beam absorbed at a surface of the lead 11 is converted to heat, and the heat is conducted to the sealing plate 10 to weld the lead 11 to the sealing plate), and the amount of sputtered substances can be reduced.

Moreover, in the process of welding the lead 11 to the sealing plate 10, even when external factors in fabrication processes vary, the size of the keyhole 17 formed in laser welding is smaller than the thickness of the lead 11. Thus, the melted area is small, and the rate of temperature rise of the heated region 11a is slowed, so that formation of a hole in the lead 11 can be reduced. As a result, the amount of the sputtered substances decreases, and the size of the keyhole 17 becomes small.

Moreover, in order to provide a stable connection strength to the welded portion 9 between the lead 11 and the sealing plate 10, the melting width of the end section (at the melting start side, or the melting end side) of the welded portion 9 is preferably smaller than or equal to 1/5 of the melting width of the center section of the welded portion 9. With this configuration, formation of a hole in the lead 11 at the start or end of the melting can be reduced, and the connection strength of the welded portion 9 can be ensured.

FIGS. 6A-6D are perspective views schematically illustrating the process of laser-welding the lead 11 to the sealing plate 10.

Figure 6:
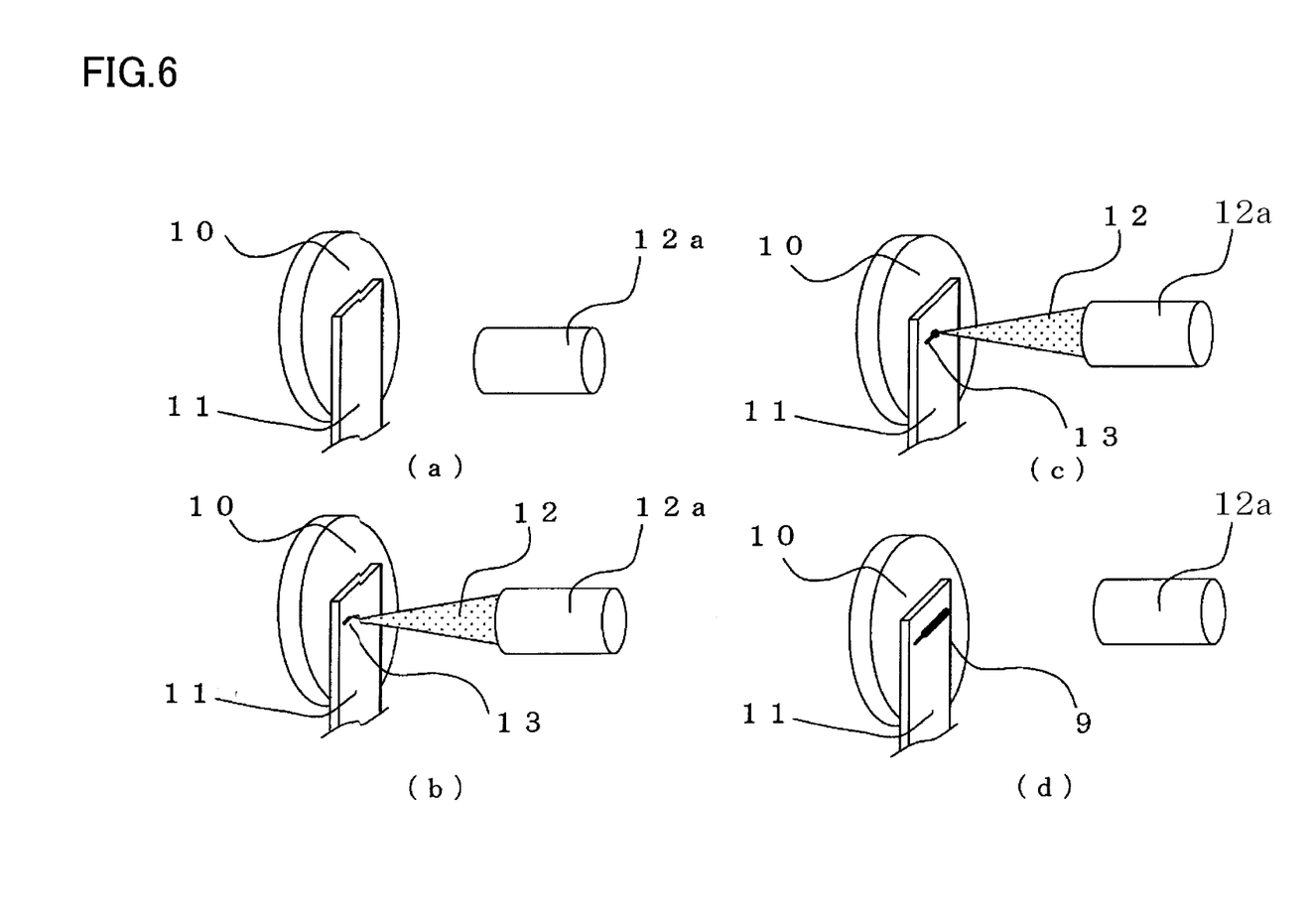
FIG. 6A-6D are perspective views schematically illustrating the process of laser-welding the lead to the sealing plat of the embodiment of the present invention.

First, as illustrated in FIG. 6A, an end section of the lead 11 extending from the electrode group 4 is brought into contact with the sealing plate 10. In this state, as illustrated in FIG. 6B, the laser beam 12 having a spot diameter smaller than the thickness of the lead 11 is scanned over the lead 11 along a width direction of the lead 11. Here, at the start of applying the laser beam 12, only part of the lead 11 in the vicinity of a focal point on which the laser beam concentrates is melted at an end section 13, and most part of the laser beam 12 is reflected at the melting start side of the welded portion. Thus, the keyhole 17 as illustrated in FIG. 5B is not formed in the end section 13 at the melting start side of the welded portion.

However, when the application of the laser beam 12 continues, the temperature of the lead 11 itself gradually increases due to the energy of the laser beam 12, thereby the keyhole 17 is formed to a slight degree. Once the keyhole 17 has been formed, multiple reflection of the laser beam 12 occurs within the keyhole 17. Thus, the energy of the laser beam 12 is efficiently absorbed into the lead 11, and as illustrated in FIG. 6C, the melting width increases, and the penetration depth increases.

Moreover, when the keyhole 17 reaches the sealing plate 10, the lead 11 and the sealing plate 10 are melted and joined to each other. After that, when the application of the laser beam 12 is stopped, and laser welding ends, as illustrated in FIG. 6D, at the welded portion 9 between the lead 11 and the sealing plate 10, the melting width of the end section 13 at the melting start side of the welded portion 9 is smaller than the melting width of the center section of the welded portion 9. That is, at the start of applying the laser beam 12 (at the melting start side), excessive laser energy is not absorbed into the lead 11, and thus the lead 11 is not directly melted or sublimed, which reduces sputtered substances. Note that in the present invention, the application of the laser beam may be continuously performed at constant power, or the application of the laser beam may be performed with the laser beam controlled such that the power is at a low level at a welding start side and is increased in the middle of the welding.

Moreover, also at the melting end side, the power of the laser beam is preferably reduced so that the melting width of the end section at the melting end side of the welded portion 9 is smaller than the melting width of the center section of the welded portion 9. With this structure, formation of a recesses in the melted cross section due to a remaining key hole 17 insufficiently filled with the welded portion can be reduced. Note that the scanning speed of the laser beam which is applied at the constant power can be increased instead of reducing the power of the laser beam. Moreover, only the melting width of the end section at the melting end side of the welded portion 9 may be smaller than the welding width of the center section of the welded portion 9.

An example in which a lithium ion secondary battery is used as a sealed battery of the present invention will be described below.

A positive electrode plate 1 was formed as follows. First, 100 parts by weight of lithium cobaltate as an active material, 2 parts by weight of acetylene black as a conductive material, and 2 parts by weight of polyvinylidene fluoride (PVdF) as a binder were stirred in a kneader together with a proper amount of N-methyl-2-pyrrolidone, thereby preparing positive electrode mixture coating. Next, the positive electrode mixture coating was applied to both surfaces of a positive electrode current collector made of aluminum foil having a thickness of 15 µm, and the applied coating was dried. After that, the positive electrode current collector provided with the positive electrode mixture coating was pressed to have a total thickness of 165 µm, and then subjected to slit processing. The positive electrode plate 1 was thus formed.

Moreover, a negative electrode plate 2 was formed as follows. First, 100 parts by weight of artificial graphite as an active material, 2.5 parts by weight (1 part by weight in terms of solid content of a binder) of styrene-butadiene copolymer rubber particle dispersion (solid content 40 wt. %) as a binder, and 1 part by weight of carboxymethylcellulose as a thickening agent were stirred in a kneader together with a proper amount of water, thereby preparing negative electrode mixture coating. Next, the negative electrode mixture coating was applied to both surfaces of a negative electrode current collector made of copper foil having a thickness of 10 µm, and then the applied coating was dried. After that, the negative electrode current collector provided with the negative electrode mixture coating was pressed to have a total thickness of 180 µm, and then subjected to slit processing. The negative electrode plate 2 was thus formed.

The positive electrode plate 1 and the negative electrode plate 2 formed as described above were wound with a separator 3 interposed therebetween, thereby forming an electrode group 4, the separator 3 being made of a polyethylene microporous film having a thickness of 20 µm. The electrode group 4 was stored in a battery case 5, with the electrode group 4 sandwiched between insulating plates 7, 8. Next, one end of a lead 18 extending from an end section of the negative electrode plate 2 in the electrode group 4 was resistance-welded to a bottom of the battery case 5. Further, a lead 11 extending from the positive electrode plate 1 in the electrode group 4 and made of aluminum foil was continuously irradiated with a laser beam 12 with the lead 11 being in contact with a sealing plate 10 made of an aluminum plate. In this way, the lead 11 was welded to the sealing plate 10. Here, the lead 11 had a thickness of 0.15 mm, and a width of 4 mm. The sealing plate 10 had a diameter of 16.8 mm, and a thickness of 0.4 mm at its portion to which the lead 11 was joined. The laser beam had a spot diameter of 0.02 mm. Moreover, a welded portion 9 between the lead 11 and the sealing plate 10 included an end section having a melting width of 0.04 mm at a melting start side and a center section having a melting width of 0.25 mm, and had a length of 2.2 mm.

Next, a nonaqueous electrolyte was injected into the battery case 5. Then, the lead 11 was bent, and the sealing plate 10 was placed on an opening of the battery case 5. The opening of the battery case 5 was sealed by being crimped onto the sealing plate 10 via a gasket 6. In this way, a lithium ion secondary battery was fabricated.

Here, when the welded portion 9 between the lead 11 and the sealing plate 10 was observed, no sputtered substances were found, and no adhesion of sputtered substances to the lead 11 and the sealing plate 10 was found. Moreover, the connection strength between the lead 11 and the sealing plate 10 was about 24 N, and this connection strength was higher than or as high has the joint strength (15-25 N) of welding by a YAG laser of the conventional technique. Moreover, also at the end section of the welded portion, a recess or a hole was not found.

A gap of 50 µm was provided between the lead 11 and the sealing plate 10, and grease was further applied between the lead 11 and the sealing plate 10. In this state, the lead 11 was laser-welded to the sealing plate 10, and the state of the welded portion was observed. No sputtered substances were found, and no adhesion of the sputtered substances to the lead 11 and the sealing plate 10 was found. Moreover, the connection strength between the lead 11 and the sealing plate 10 was about 24 N, and a recess or a hole was not found at the end section of the welded portion. With this configuration, even when external factors in fabrication processes vary, laser welding with reduced sputtered substances is possible, and the connection strength which is as high as or higher than that obtained by using a YAG laser can be maintained.

It should be recognized that the foregoing embodiments are only preferred examples of the present invention, and should not be taken as limiting the scope of the present invention, and various changes and modifications may be made. For example, in the above embodiments, the lead 11 and the sealing plate 10 are made of the same aluminum material, but the lead 11 and the sealing plate 10 may be made of different types of metal. The shape of the continuous welded portion is not particularly limited, and a linear shape, a wave shape, or a ring shape may be possible. To seal the opening of the battery case 5, the sealing plate 10 to which the lead 11 is welded is not necessarily crimped onto the opening of the battery case 5, and may be welded to the opening of the battery case 5.

The type of a sealed battery according to the present invention is not specifically limited, and the present invention is also applicable not only to lithium-ion secondary batteries, but also to nickel-metal hydride storage batteries. Further, the present invention is applicable not only to cylindrical secondary batteries, but also to rectangular secondary batteries and primary batteries. The electrode group is not necessary formed by winding a positive electrode plate and a negative electrode plate with a separator interposed between the positive electrode plate and the negative electrode plate, and may be formed by stacking a positive electrode plate, a negative electrode plate, and a separator.

INDUSTRIAL APPLICABILITY

According to the present invention, a stable and highly reliable sealed battery can be obtained, and the present invention is applicable to power sources for driving mobile devices, and the like.

DESCRIPTION OF REFERENCE CHARACTERS

1 Positive Electrode Plate
2 Negative Electrode Plate
3 Separator
4 Electrode Group
5 Battery Case
6 Gasket
7, 8 Insulating Plate
9 Welded Portion 10 Sealing Plate
11, 18 Lead
11a Heated Region
12 Laser Beam
12a Laser Processing Head
13 End section of Welded Portion
14 High-Pressure Plasma
17 Keyhole
40 Sealing Plate
41 Electrode Group
42 Lead
42a Heated Region
43 Welded Portion
44 Laser Beam
45 Welded Portion
46 High-Pressure Plasma
47 Sputtered Substance
49 Foreign Substance
50 Gap
51 Hole

The invention claimed is:

1. A sealed battery comprising:
an electrode group formed by winding or stacking a positive electrode plate and a negative electrode plate with a separator interposed between the positive electrode plate and the negative electrode plate, and housed in a battery case, an opening of the battery case being sealed with a sealing plate, wherein
a lead extending from one of the electrode plates in the electrode group includes a welded portion linearly laser-welded to the sealing plate by continuously scanning a laser beam,
the laser beam has a spot diameter smaller than a thickness of the lead,
the linearly welded portion has, in its longitudinal direction, only one end section at which welding is started, and only one other end section at which welding is terminated, and
the only one other end section, of the welding portion, at which welding is terminated has a melting width in an extending direction of the lead narrower than a melting width in an extending direction of the lead of a center section of the welding portion, and
the melting width of the only one other end section at which welding is terminated of the linearly welded portion is substantially constant.

2. The sealed battery of claim 1, wherein the lead includes the welded portion formed by continuously scanning a laser beam having a spot diameter smaller than a thickness of the lead between its surface on which the welded portion is formed and a surface opposite thereto.

3. The sealed battery of claim 1, wherein the melting width of the center section of the linearly welded portion is substantially constant.

* * * * *